United States Patent
Choi

(10) Patent No.: US 9,051,772 B2
(45) Date of Patent: Jun. 9, 2015

(54) SLIDING DOOR GUIDE STRUCTURE FOR VEHICLE

(71) Applicant: Hyundai Motor Company, Seoul (KR)

(72) Inventor: Jae Hong Choi, Gwangmyeong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 9 days.

(21) Appl. No.: 13/901,484

(22) Filed: May 23, 2013

(65) Prior Publication Data

US 2014/0158837 A1    Jun. 12, 2014

(30) Foreign Application Priority Data

Dec. 11, 2012    (KR) .......................... 10-2012-0143657

(51) Int. Cl.
  *E06B 3/46*    (2006.01)
  *E06B 3/32*    (2006.01)
  *H02G 3/30*    (2006.01)

(52) U.S. Cl.
  CPC ... *E06B 3/32* (2013.01); *H02G 3/30* (2013.01)

(58) Field of Classification Search
  USPC .......................... 24/283, 32, 39; 49/332, 352
  See application file for complete search history.

(56) References Cited

U.S. PATENT DOCUMENTS

| | | | | | |
|---|---|---|---|---|---|
| 1,468,297 | A | * | 9/1923 | Hogg et al. ...................... | 24/283 |
| 3,141,220 | A | * | 7/1964 | Gewiss ........................... | 24/283 |
| 4,442,632 | A | * | 4/1984 | Greco et al. .................... | 49/352 |
| 4,823,512 | A | * | 4/1989 | Maekawa et al. ............... | 49/352 |
| 7,325,360 | B2 | * | 2/2008 | Mazouzi et al. ................ | 49/352 |
| 7,334,498 | B2 | * | 2/2008 | Yokomori et al. ........... | 74/502.4 |
| 2002/0062599 | A1 | * | 5/2002 | Cabanne et al. ................ | 49/502 |
| 2004/0154227 | A1 | * | 8/2004 | Yoshimura ....................... | 49/352 |
| 2005/0016070 | A1 | * | 1/2005 | Cardine et al. .................. | 49/352 |

FOREIGN PATENT DOCUMENTS

| | | |
|---|---|---|
| JP | 11-166366 | 6/1999 |
| JP | 2002-097838 A | 4/2002 |
| JP | 2003-176663 A | 6/2003 |
| JP | 2005-248514 A | 9/2005 |
| JP | 2005-320812 A | 11/2005 |
| JP | 2010-242358 A | 10/2010 |
| JP | 2011-074579 A | 4/2011 |
| KR | 10-1150813 B1 | 6/2012 |

* cited by examiner

*Primary Examiner* — Bradley Duckworth
(74) *Attorney, Agent, or Firm* — McDermott Will & Emery LLP

(57) ABSTRACT

A finely adjustable wire holder includes a holder body fixed to a vehicle body; two nut parts disposed at both sides of the holder body, respectively, and having a wire penetrating therethrough; a wire end connecting end portions of the wires penetrating through the two nut parts to each other; and a fixer adjusting and fixing a position of the wire end positioned between the two nut parts.

7 Claims, 4 Drawing Sheets

SLIDING DOOR GUIDE STRUCTURE FOR VEHICLE

CROSS-REFERENCE TO RELATED APPLICATION

This application claims benefit of priority to Korean Patent Application No. 10-2012-0143657, filed on Dec. 11, 2012 in the Korean Intellectual Property Office, the entirety of which is incorporated herein by reference.

TECHNICAL FIELD

The present disclosure relates to a wire holder, and more particularly, to a holder structure capable of finely adjusting a fixed position, on a vehicle body, of a wire for transferring a driving force, the driving force allowing a sliding door of a vehicle to be slid with respect to the vehicle body.

BACKGROUND

When a vehicle does not have much space from a neighboring vehicle in a narrow parking space, and a hinge type door is used in the vehicle, an opening angle of the door is small, such that it was very difficult for a person to get in or get off a vehicle, and an end portion of the door hits the neighboring vehicle to damage a vehicle body of the neighboring vehicle.

In addition, when the person parks the vehicle on a shoulder and then opens the door, the hinge type door blocks the way of other two-wheeled vehicles, bicycles, or vehicles following the vehicle to cause an accident.

Therefore, recently, a sliding door has been gradually used in order to secure a space for people getting in or getting off the vehicle, and prevent an accident.

FIG. 1 is a perspective view of a rail structure of a sliding door in a vehicle according to the prior art when viewed from the outside of a vehicle body. The sliding door according to the prior art has been configured to include a top rail 91 and a bottom rail 95 installed on a ceiling surface and a bottom surface of an inner portion of a vehicle, respectively, and a center rail 93 installed on an outer surface of the vehicle in order to guide a sliding operation of the sliding door along the top and bottom rails 91, 95.

However, in the structure according to the prior art as described above, since the rails installed on the ceiling surface and the bottom surface of the inner portion of the vehicle occupy much space of a ceiling portion and a bottom portion, an internal space becomes small. In addition, a structure in which the rail such as the center rail is exposed on the outer surface of the vehicle significantly deface the appearance of the vehicle, which is not preferable.

Therefore, applicants have developed an invisible sliding door guide structure in which rail structures are removed from a vehicle body and move together with a door.

Meanwhile, it needs to simplify the invisible sliding door guide structure and improve durability and reliability of the invisible sliding door guide structure when the invisible sliding door guide structure is configured as an automatic opening or closing structure. To this end, it is preferable to transfer a driving force of opening or closing operation of a door using a wire. That is, the wire is fixed to the vehicle body and the door pulls the wire, such that the door is slid.

However, the invisible sliding door guide does not simply generate a sliding operation of the door, but generates a complex link operation which pops up the door from the vehicle body and slides the door with respect to the vehicle body, while the wire fixed to the vehicle body is connected to the motor in order to slide the door with respect to the vehicle body. Thus, the opening or closing operation of the door may not be performed as intended. The motor and the vehicle body are connected to each other by the wire in order to perform the sliding operation, and the motor also provides power for the pop-up operation of the door. Since these two operations interlock with each other, a fixed position of the wire with respect to the vehicle body should be adjusted in order to adjust a pop-up position and a sliding position of the door with respect to the vehicle body according to driving of the motor.

To address the above problem, wire fixing means has been used in the prior art. However, it is significantly inconvenient to apply wire fixing means to the above-mentioned structure.

SUMMARY

Accordingly, the present disclosure purports to solve the above-mentioned problems occurring in the prior art while maintaining advantages achieved by the prior art intact.

One aspect of the present disclosure encompasses a wire holder capable of conveniently and finely adjusting a fixed position of a connection wire required for an opening or closing operation with respect to a vehicle body in an invisible sliding door guide structure in which rail structures installed on a ceiling surface or a bottom surface of an inner portion of a vehicle and an outer surface of a vehicle body are removed and a rail itself moves together with a door.

One aspect of the present disclosure provides a finely adjustable wire holder including: a holder body fixed to a vehicle body; two nut parts disposed at both sides of the holder body, respectively, and having a wire penetrating therethrough; a wire end connecting end portions of the wires penetrating through the two nut parts to each other; and a fixer adjusting and fixing a position of the wire end positioned between the two nut parts.

The fixer fixes the position of the wire end by screwing adjusting bolts which have through-holes formed in a length direction to inner diameters of the two nut parts in which screw threads are formed, respectively, and by fastening the wire end to end portions of the adjusting bolts or by adjusting positions of the adjusting bolts with respect to the two nut parts.

The adjusting bolts may have screw thread parts and heads, wherein the heads are disposed at outer sides of the two nut parts, respectively.

The holder body may be provided with a window capable of confirming the position of the wire end.

The holder body may be coupled to the vehicle body through a vehicle body fixing part which is a long hole lengthily formed in the same direction as a length direction of the wire.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Hereinafter, exemplary embodiments of the present disclosure will be described in detail with reference to the accompanying drawings.

Figure 1:
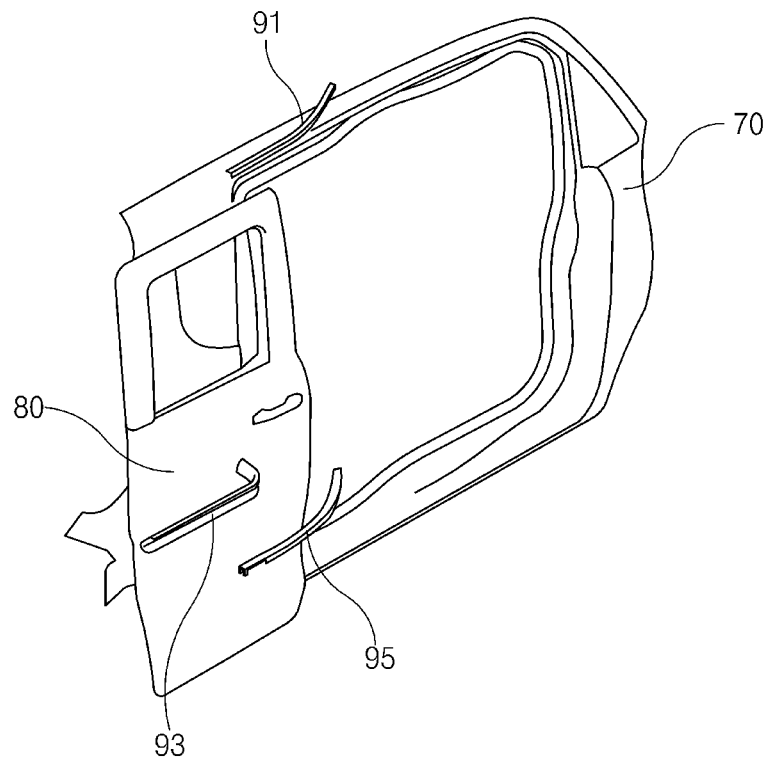
FIG. 1 is a perspective view of a rail structure of a sliding door of a vehicle according to the prior art when viewed from the outside of a vehicle body.
Figure 2:
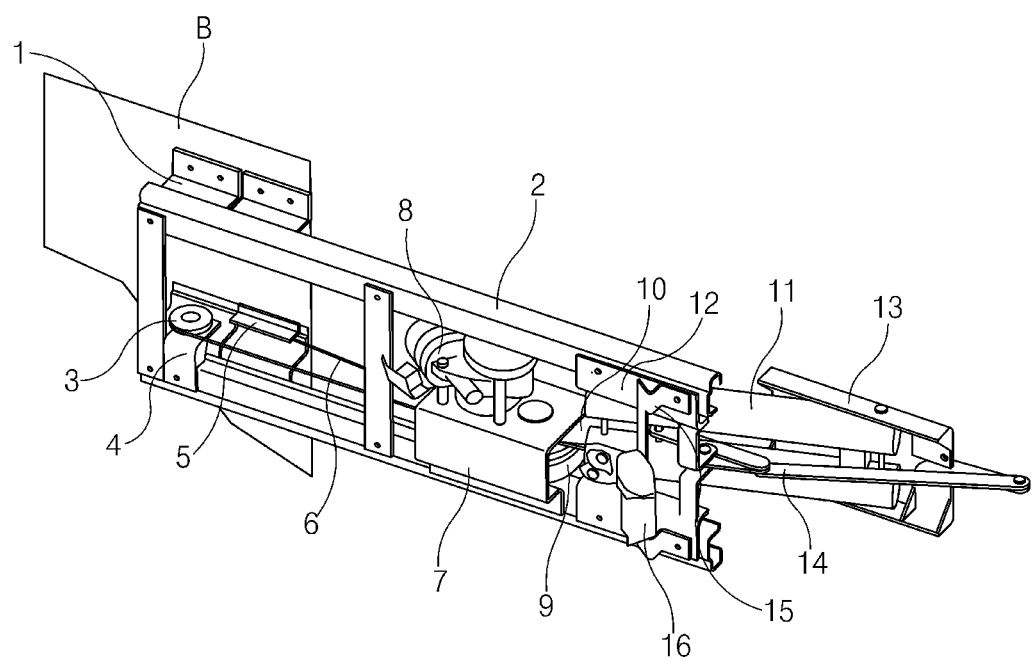
FIG. 2 is a perspective view showing an invisible sliding door guide structure to which a wire holder according to an exemplary embodiment of the present disclosure is applied.

FIG. 2 is a perspective view showing an invisible sliding door guide structure to which a wire holder according to an exemplary embodiment of the present disclosure is applied.

In the invisible sliding door guide structure according to the exemplary embodiment of the present disclosure, as shown in FIG. 2, a slider 1 is fixed from a vehicle body B toward an interior, and a rail 2 is coupled to the slider 1 so as to be slidable in a horizontal direction on the accompanying drawings (FIG. 2 shows a state in which the rail is positioned at the leftmost side).

A pulley 3 is rotatably installed on a pulley bracket 4 installed at a rear end of the rail 2, and a motor 8 is fixed to a motor bracket 7 installed on the rail 2. A drum 9 interlocking with the above-mentioned motor 8 is rotatably installed in the motor bracket 7.

A wire 6 is wound around the pulley 3 and the drum 9, and a predetermined section of the wire 6 is fixed to the vehicle body B with a wire holder 5. Therefore, when the motor 8 rotates in one direction, the rail 2 is slid in one direction along the wire 6, and when the motor 8 rotates in the other direction, the rail 2 is slid in the other direction along the wire 6.

Meanwhile, a front end of the rail 2 is installed with a body bracket 12, which is connected to a door bracket 13 through a link structure between a main arm 11 and links 14. The door bracket 13 is fixed to a door (not shown).

Since the door is fixed to the rail 2 through the link structures 11 and 14 as described above, the door may pop-up and move in a direction toward an outer side of the door, that is, an opposite direction to the direction in which the rail 2 is positioned with respect to the vehicle body B in FIG. 2.

The above-mentioned pop-up movement may be performed by driving a sector gear 10 connected to the main arm 11 using the motor 8. That is, when the motor 8 rotates in one direction, the main arm rotates, such that the door pops up from the vehicle body, and when the motor rotates in the other direction, the main arm is reversely rotated, such that the door is seated on the vehicle body. When the pop-up operation of the door is completed, the sector gear 10 is fixed by a hold open latch 16 installed on a latch bracket 15 fixed onto the rail 2. Therefore, the door may be maintained at a pop-up position by the hold open latch 16.

In summary, when a door open button is pressed in a state in which the door is closed, the motor rotates in one direction to pop up the door to the link structures 11 and 14 and at the same time, starts to slide the door, wherein the sliding of the door is performed by rotation of the drum 9 around which the wire is wound. That is, since the wire 6 wound around the pulley 3 is fixed onto the rail 2 and the drum 9 is fixed to the vehicle body B through the wire holder 5, the rail (door) is slid along the wire 6.

As described above, since the motor provides power for the pop-up operation of the door as well as the sliding operation of the rail according to the rotation of the drum and these two operations interlock with each other, a fixed position of the wire with respect to the vehicle body needs to be adjusted in order to adjust a pop-up position and a sliding position of the door with respect to the vehicle body according to the driving of the motor.

A structure for adjusting a fixed position of the wire will be described below with reference to FIGS. 3 and 4.

Figure 3:
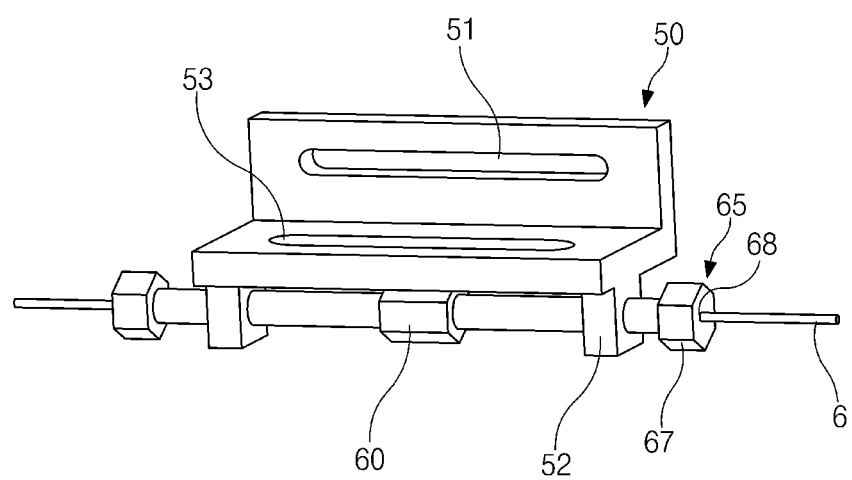
FIG. 3 is a perspective view showing a state before the wire holder according to the exemplary embodiment of the present disclosure fixes a wire.
Figure 4:
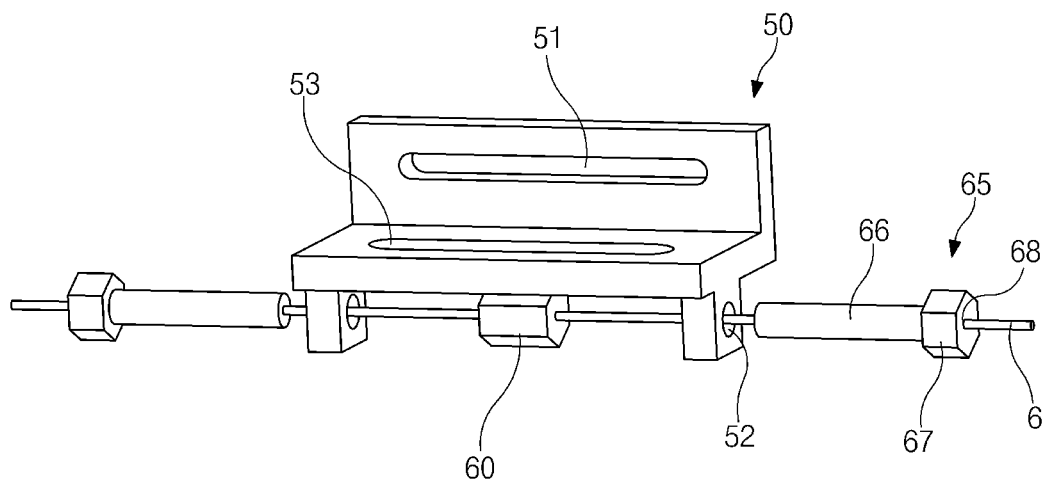
FIG. 4 is a perspective view showing a state in which a fixed position of the wire is adjusted and the wire is then fixed using the wire holder according to the exemplary embodiment.

FIG. 3 is a perspective view showing a state before the wire holder according to the exemplary embodiment of the present disclosure fixes a wire; and FIG. 4 is a perspective view showing a state in which a fixed position of the wire is adjusted and the wire is then fixed using the wire holder according to the exemplary embodiment.

The wire holder 5 according to the exemplary embodiment of the present disclosure includes a holder body 50 fixed to the vehicle body B, wherein the holder body 50 is fixed to the vehicle body by bolting, or the like, through a vehicle body fixing part 51 lengthily formed in the same direction as a length direction of the wire.

Next, both sides of the holder body 50 are provided with nut parts 52. The wires 6 penetrates through through-holes of the nut parts 52 and end portions of the wires 6 penetrating through the nut parts 52 are fixed at a wire end 60 between these two nut parts 52.

The wire holder 5 according to the exemplary embodiment includes fixers adjusting and fixing a position of the wire end 60 positioned between the two nut parts 52, wherein the fixers are the nut parts 52 and adjusting bolts 65 bolted thereto.

Describing these components in detail, the adjusting bolt 65 has the wire 6 penetrating through a through-hole 68 thereof formed in the length direction. That is, the adjusting bolt 65 may move independently of the wire in the length direction of the wire. Meanwhile, the nut part 52 has a screw thread formed on an inner diameter thereof and a screw thread part 66 formed on an outer diameter of the adjusting bolt 65 is screwed to the inner diameter of the nut part 52. In addition, heads 67 of the adjusting bolts 65 are disposed at outer sides of the two nut parts 52, respectively.

Therefore, when the adjusting bolts 65 are bolted to the nut parts 52 in a state in which the adjusting bolts 65 are movable along the wire 6 as shown in FIG. 3 to fasten the wire end 60 to end portions of the adjusting bolts 65 as shown in FIG. 4, the position of the wire end may be fixed. As a result, a fixed position of the wire 6 is determined.

The position of the wire end may be adjusted by adjusting the positions of the adjusting bolts 65 with respect to the nut parts 52. In the case in which the fixed position of the wire 6 is to further move to the right in FIG. 4, when a right adjusting bolt 65 is loosened up to a position to which the wire end is to move and a left adjusting bolt 65 is again bolted to again fasten the wire end to two bolts, the position adjustment is completed.

It is easier to configure the above-mentioned position adjustment through a window 53 formed between the two nut parts 52 in the length direction in the holder body 50. That is, when a lower portion of the holder body has a form in which it is buried in a predetermined structure, the adjusted position of the wire may be confirmed through the window.

The wire holder 5 according to the exemplary embodiment is installed at the wire end 60 portion and is fixed to the vehicle body in order to prevent the wire 6 wound around the motor (drum) and the pulley from rotating in situ. The wire holder 5 is fixed using the bolt through the vehicle body fixing part 51. In this case, the position adjustment may be performed in a scheme of slightly loosening the bolt, adjusting the length direction through the vehicle body fixing part 51 having a long hole shape, and then bolting the bolt. In the case of loosening the bolt connected to the vehicle body and then adjusting horizontally the position along a long hole of the vehicle body fixing part 51 as described above, when the wire 6 is tightly coupled, it is difficult to perform fine adjustment.

In this case, the fine adjustment may be performed using the adjustment bolts 65 connected to both ends of the wire holder as described above. Particularly, this fine adjustment is required when gear engagement between the drum and the sector gear is corrected. That is, in the case in which the door is very slowly opened or does not maintain a sufficient open width in a state in which the door is installed, the gear engagement between the drum and the sector gear is corrected. In this case, the fine adjustment of the wire holder is required. Therefore, since the wire holder may finely adjust the fixed position of the wire holder, an amount of opening and the speed of the door may be finely adjusted.

According to the exemplary embodiment of the present invention, a phenomenon that power of the motor is appropriately transferred due to looseness, or the like, of the wire caused by the vehicle body and the assembling dispersion may be prevented.

In addition, according to the exemplary embodiment of the present invention, a door open amount, a door automatic operation speed, and the like, that may be generated due to the assembling dispersion, or the like, after a modularized invisible power sliding door system is mounted in a vehicle may be finely adjusted. That is, looseness or tightness of the wire generated at the time correcting the engagement between the drum and the sector gear may be finely adjusted.

The respective components of the present invention may be appropriately changed in a range in which their functions are not changed, and are not limited to the above-mentioned embodiment, but may be freely changed without departing from the scope and spirit of the present invention defined by the following claims.

What is claimed is:

1. A sliding door guide structure for a vehicle comprising:
  a link structure for guiding movement of the sliding door guide structure,
  a holder body fixed to a vehicle body;
  two nut parts disposed at both sides of the holder body, respectively, each having a wire penetrating therethrough;
  a wire end connector for connecting ends of the wires, the ends of the wires penetrating through the two nut parts; and
  a fixer for adjusting and fixing a position of the wire end connector positioned between the two nut parts,
  wherein the fixer fixes the position of the wire by screwing adjusting bolts, which have through-holes formed in a length direction, into inner diameters of the two nut parts in which screw threads are formed and by fastening the wire end connector to end portions of the adjusting bolts,
  the wires penetrate through the through-holes, and
  the fixer is provided on both sides of the holder body so that two fixers rotatably move from the both sides of the holder body and fix the holder body.

2. The sliding door guide structure according to claim 1, wherein the fixer fixes the position of the wire by adjusting positions of the adjusting bolts with respect to the two nut parts.

3. The sliding door guide structure according to claim 1, wherein the adjusting bolts have screw thread parts and heads, the heads being disposed at outer sides of the two nut parts, respectively.

4. The sliding door guide structure according to claim 2, wherein the adjusting bolts have screw thread parts and heads, the heads being disposed at outer sides of the two nut parts, respectively.

5. The sliding door guide structure according to claim 1, wherein the holder body is provided with a window capable of confirming the position of the wire end connector.

6. The sliding door guide structure according to claim 1, wherein the holder body is coupled to the vehicle body through a vehicle body fixing part which is an elongated hole formed in the same direction as a length direction of the wire.

7. The sliding door guide structure according to claim 1, wherein the link structure includes a main arm and a plurality of links and rotates by a motor.

* * * * *